(12) United States Patent
Chang et al.

(10) Patent No.: US 6,304,541 B1
(45) Date of Patent: Oct. 16, 2001

(54) SINGLE OBJECTIVE LENS OPTICAL PICK-UP HEAD

(75) Inventors: Hung-Lu Chang, Taichung; Jau-Jiu Ju, Hsinchu, both of (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/417,952

(22) Filed: Oct. 13, 1999

(30) Foreign Application Priority Data

Aug. 25, 1999 (TW) ............................................. 88114547 A (51) Int. Cl.[7] ....................................................... G11B 7/00
(52) U.S. Cl. ...................... 369/112.06; 369/118
(58) Field of Search ................ 369/103, 112.01, 369/112.03, 112.04, 112.05, 112.06, 112.07, 112.1, 112.11, 112.12, 112.15, 118, 121

(56) References Cited

U.S. PATENT DOCUMENTS

| | | | |
|---|---|---|---|
| 6,067,283 | * | 5/2000 | Muramatsu ................... 369/44.23 X |
| 6,130,872 | * | 10/2000 | Sugiura et al. .............. 369/112.15 X |
| 6,222,812 | * | 4/2001 | Yoo et al. ..................... 369/44.37 X |

* cited by examiner

Primary Examiner—Paul W. Huber (57) ABSTRACT

The present invention is an optical pick-up head with a single objective lens, which discloses an optical pick-up head that can retrieve data from CD and DVD with different thickness using a single objective lens and a special optical element on the optical path of the optical pick-up head. This optical element is a three-beam grating which is formed a reflective film thereon, for example, by coating a metal or dielectric layer to achieve the goal of controlling the numerical aperture. Thus, this invention provides a single objective lens optical pick-up head with simple structure, low cost, easy assembling, and applications to multi-wavelength systems.

14 Claims, 9 Drawing Sheets

SINGLE OBJECTIVE LENS OPTICAL PICK-UP HEAD

BACKGROUND OF THE INVENTION

1. Field of the Invention

The invention relates to an optical pick-up head with a single objective lens and, in particular, to an optical retrieving apparatus that retrieves data from CD (compact disc) and DVD (digital versatile disc) of different thickness using a single objective lens.

2. Related Art

The technologies of storing data on CD and DVD and accessing data stored on these two types of discs via an optical retrieving apparatus are well known. The access to the data is proceeded via the optical pick-up head. The principle of retrieving data from the discs is: first focus a laser beam into a spot on the data storage surface of the disc, then convert the data signal beam reflected from the surface of the disc into recognizable electrical signals with the help of a photo detector. The process of storing data is the reverse of retrieving. The size and specification of the CD and DVD are listed in Table 1.

TABLE 1

|     | THICKNESS mm | TRACK PITCH μm | WAVELENGTH nm | NA |
| --- | --- | --- | --- | --- |
| CD  | 1.2 | 1.6 | 780 | 0.45 |
| DVD | 0.6*2 | 0.74 | 635–650 | 0.6 |

NA: numerical aperture

From Table 1 one can obviously see that DVD has a relatively higher storage density than CD. The differences in both sizes and, in particular, storage densities result in different requirements for the optical accessing apparatus. To retrieving data on the data storage surfaces of CD and DVD, the optical pick-up head plays an important role, whereas the optical system design is the most important part in the optical pick-up head.

Therefore, one needs to design an optical system in which the laser beam focuses on the correct spot with a proper size using two different numerical apertures to have a correct access the data on CD and DVD according to the respective thickness of the discs.

Owing to the compatibility issues, commercialized products using a single optical pick-up head have to be able to correctly access the data on the CD and DVD, and, therefore, how to make a dual focusing optical system is the key point.

The technologies of making dual focusing optical pick-up head for accessing data on CD and DVD can be classified into the following categories:

1. Use two objective lenses with different foci in the system, and then select one of them by a driving mechanism according to the type of the discs (CD or DVD). The drawback, however, is that both the weight of the optical pick-up head and its price increase significantly.
2. Put diffractive element on the objective lens to achieve the dual focusing effect.
3. Use holographic optical element (HOE) to generate double foci. Nevertheless, it is hard to manufacture and requires a higher cost.
4. Make a numerical aperture controller with the liquid crystal display (LCD) shutter so that the beam passes through the objective lens with two different numerical apertures to achieve the dual focusing effect. But the polarization of the laser source has to be accurately controlled so as to cooperate with the LCD shutter. In addition, the operation of the LCD shutter demands a continuous power supply.
5. Make a ring structure on the objective lens. Retrieve the CD data by the beam passing through the central area while access the DVD data by the combination of the beams passing through the inner circle and the outer ring. For example, the U.S. Pat. No. 5,665,957 (illustrated in FIGS. 1 and 2) discloses a similar technology, wherein a hologram lens with a certain pattern on the surface is utilized to generate the dual focusing effect. The disadvantages are higher cost and lower installation error permissibility (high precision requirement), which decreases the usage of the beam by 15%.
6. Utilize two light sources and two types of lenses. The U.S. Pat. No. 5,777,970 discloses a system using two laser sources with different wavelengths accompanying two lenses of different foci to provide accessing light spots with different sizes. Yet, the drawbacks are higher cost and complicated structure.
7. Use the design of a variable aperture along with a movable objective lens to achieve the goal of dual focusing, as disclosed in the U.S. Pat. Nos. 5,659,533 and 5,281,797.

SUMMARY OF THE INVENTION

The invention provides a single objective lens optical pick-up head with simple structure, low cost, easy assembling, and applications to multi-wavelength systems, which only utilizes a traditional optical pick-up head along with a single objective lens. A three-beam grating is placed on the optical path for controlling the numerical aperture by the reflective film formed on the surface of the grating to allow the access of the data stored on the CD and DVD.

The single objective lens optical pick-up head according to the present invention comprises:

a first laser beam generator and a second laser beam generator for generating two laser beams with different wavelengths to access the optical storage media;

an optical element, which is a reflective film formed on the surface of a three-beam grating, for controlling the numerical aperture of the second laser diode;

a first beam splitter cube and a second beam splitter cube for separating the two laser beams with different wavelengths from the reflected beam from the optical storage media;

a collimator lens for making each of the two beams of different wavelengths into parallel beams;

an objective lens for focusing each of the parallel beams of two different wavelengths into a spot on the data storage surface of the optical storage media;

a photo detector for converting the reflected beam from the optical storage media into electrical signals; and a focusing lens for focusing the reflected beam from the first beam splitter cube on the photo detector.

The optical element according to the invention is a reflective film formed on a three-beam grating by coating a reflective film of, for example, metal or dielectric layer to achieve the goal of controlling the numerical aperture. The three-beam grating is a diffractive optical element, through which the laser beam will be separated into beams of the 0 level, −1 level and +1 level, wherein only one beam will be led to the optical storage media by the optical element. Therefore, the invention only requires the optical element along with a single objective lens to perform the data access on the CD and DVD.

BRIEF DESCRIPTION OF THE DRAWINGS

The drawings disclose an illustrative embodiment of the present invention which serves to exemplify the various advantages and objects hereof, and are as follows.

DETAILED DESCRIPTION OF THE PREFERRED EMBODIMENT

The single objective lens optical pick-up head disclosed in the invention can perform data access on CD and DVD with a traditional optical pick-up head using only a single objective lens.

Figure 1:
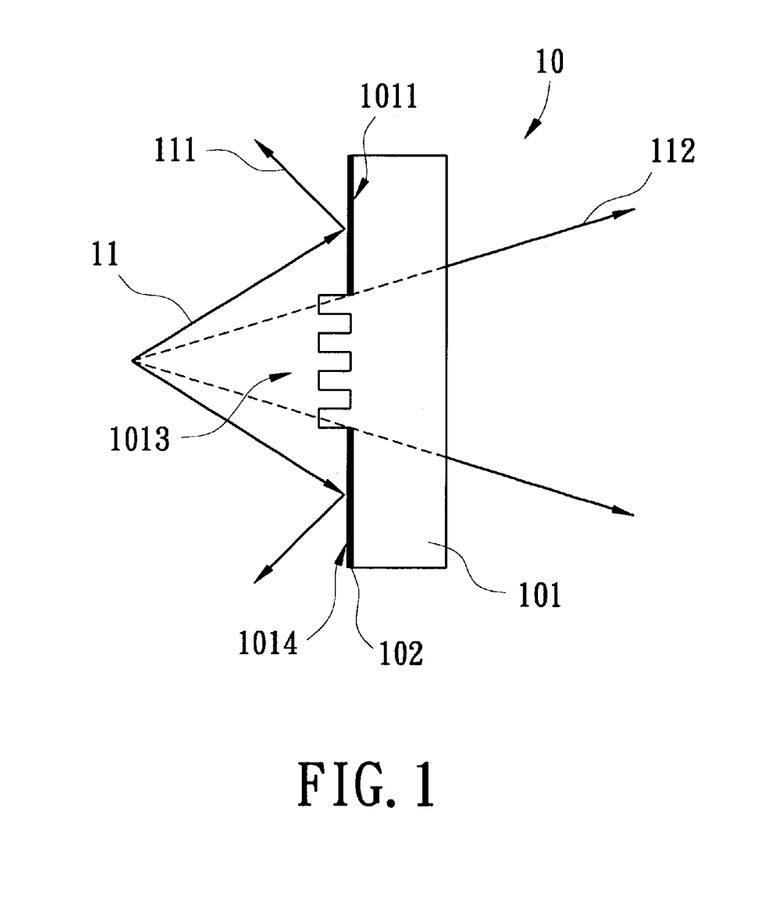
FIG. 1 shows a structure of the first embodiment of the optical element according to the invention.

As shown in FIG. 1, the first optical element 10 according to the invention is a reflective film 102 formed on the incident plane 1011 of a three-beam grating 101 by coating a layer of, for example, metal or dielectric material to generate the reflective effect and control the numerical aperture. The central area for incident laser beam 11 to pass through is the first diffractive area 1013, around which the ring area including the reflective film 102 is the second diffractive area 1014.

When an incident laser beam 11 reaches the incident plane 1011, part of the beam passes through the first diffractive area 1013 and forms an outgoing beam 112, while the rest of the beam is reflected into a reflected beam 111 by the reflective film 102 on the second diffractive area 1014. Thus, the numerical aperture can be properly controlled.

Figure 2:
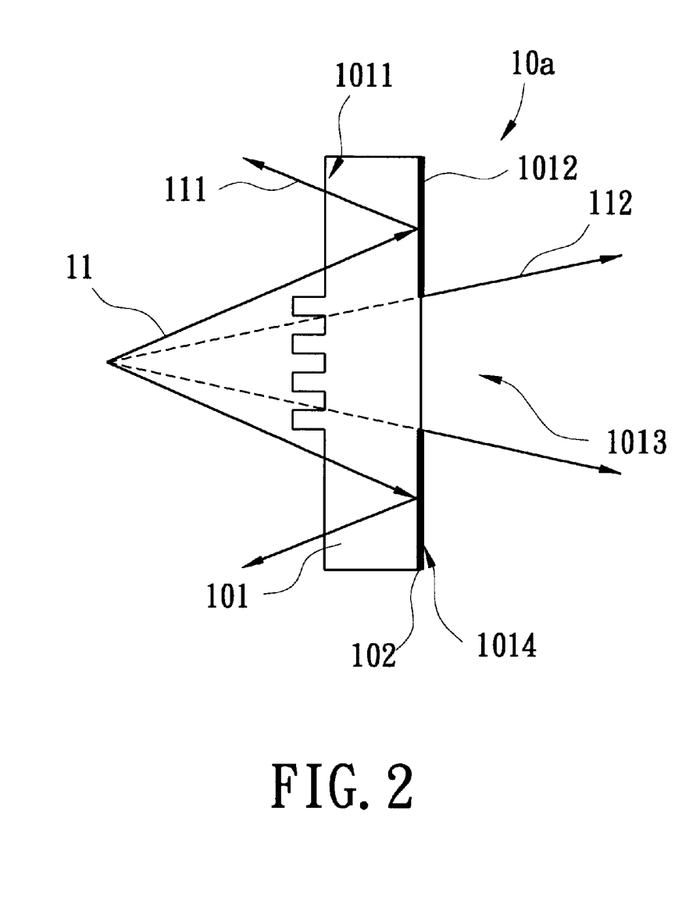
FIG. 2 shows a structure of the second embodiment of the optical element according to the invention.

FIG. 2 is another optical element 10a disclosed by the invention. A reflective film 102 is coated on the outgoing plane 1012 of a three-beam grating 101 to form a first diffractive area 1013 and a second diffractive area 1014. The numerical aperture can be controlled as described above.

Figure 3:
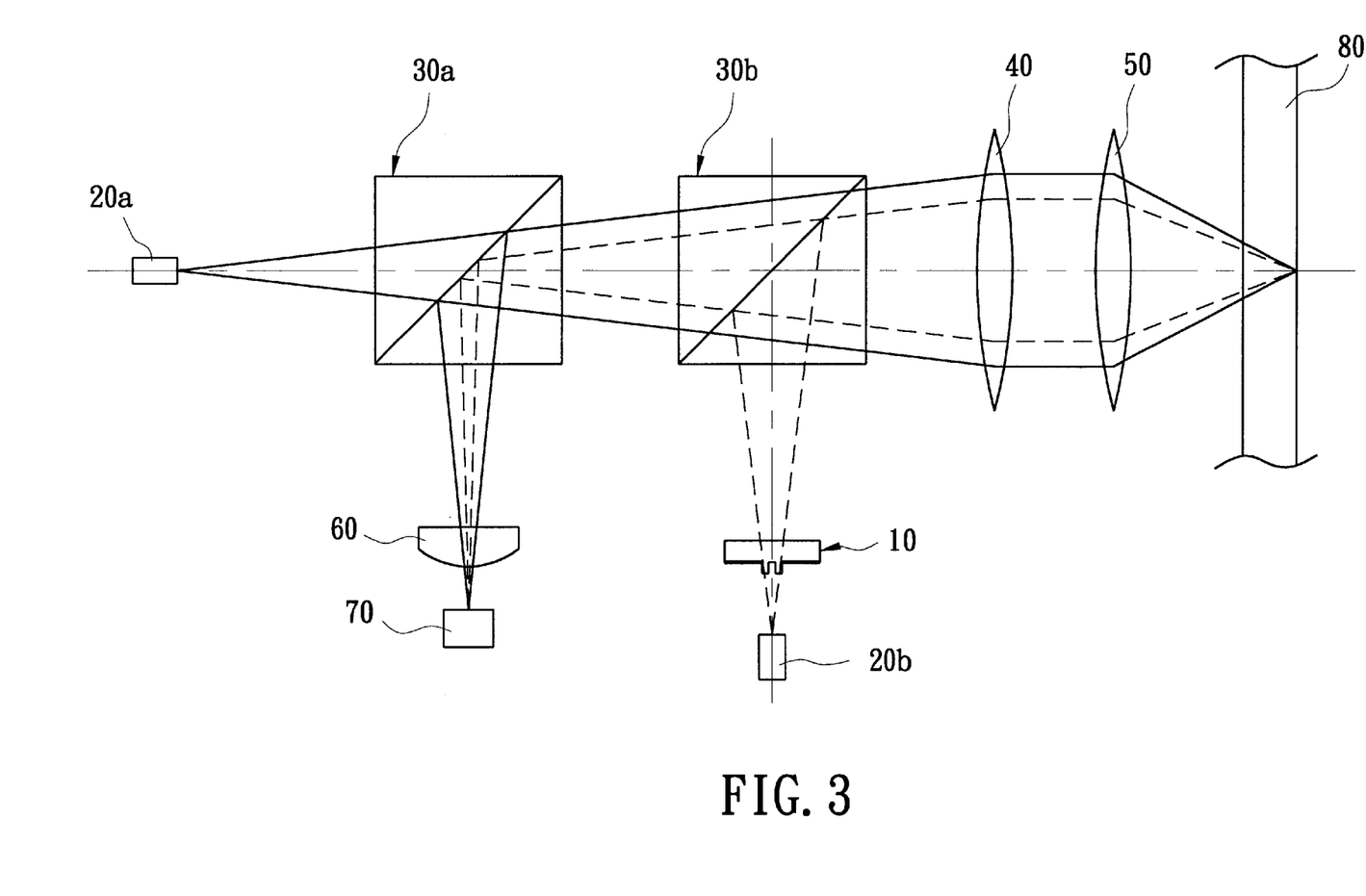
FIG. 3 shows a structure of the single objective lens optical pick-up head in the first embodiment of the invention.

FIG. 3 shows the structure of the single objective lens optical pick-up head in the first embodiment of the invention. The single objective lens optical pick-up head comprises:

a first laser beam generator 20a and a second laser beam generator 20b for generating two laser beams with different wavelengths to access the optical disc 80;

a first beam splitter cube 30a and a second beam splitter cube 30b for separating the two laser beams with different wavelengths from the first laser beam generator 20a and the second laser beam generator 20b from the reflected beam from the optic disc 80;

an optical element 10 with the structure described in either FIG. 1 or FIG. 2, which is placed between the second laser beam generator 20b and the second beam splitter cube 30b for controlling the numerical aperture of the laser beam from the second laser beam generator 20b;

a collimator lens 40 for making each of the two beams of different wavelengths into parallel beams;

an objective lens 50 for focusing each of the parallel beams of two different wavelengths into a spot on the data storage surface of the optic disc 80;

a photo detector 70 for converting the reflected beam from the optic disc 80 into electrical signals; and a focusing lens 60 for focusing the reflected beam from the first beam splitter cube 30a on the photo detector 70.

In particular, the laser beam from the second laser beam generator 20b passes through the optical element 10 and reaches the second beam splitter cube 30b. The collimator lens 40 then processes it into a parallel beam that goes to the objective lens 50. Finally, the beam is focused by the objective lens 50 into a spot on the data storage surface of the optical storage media, namely, the optic disc 80. The laser beam containing data and reflected from the optic disc 80 follows the original path but in the reverse order to pass through the objective lens 50, the collimator lens 40, the second beam splitter cube 30b, the first beam splitter cube 30a and is focused on the photo detector 70 by the focusing lens 60. The laser beam that contains data from the optic disc 80 is herein converted into corresponding electrical signals and this completes the data retrieve from the optic disc 80.

The laser beam from the first laser beam generator 20a passes through the first beam splitter cube 30a, the second beam splitter cube 30b, the collimator lens 40, the objective lens 50 and reaches the optic disc 80. Then, by following the same returning path of the laser beam from the second laser diode 20b described above, the reflected beam is focused on the photo detector 70 by the focusing lens 60. The laser beam that contains data from the optic disc 80 is herein converted into corresponding electrical signals, and this completes the data retrieve from the optic disc 80 by an optical pick-up head compatible with CD and DVD using a single objective lens.

As to the storing process of data into the optical storage media, the incident and reflected laser beams are still following the same optical path as described above in the data retrieving process. The difference is in that the driving circuit of the laser source is modulated by a function generator to turn the laser beam on and off. Due to the photothermal effect on the material, the data storage surface of the optical storage media then records data by forming holes representing "0" and "1" according to the "on" and "off" of the laser beam.

Figure 4:
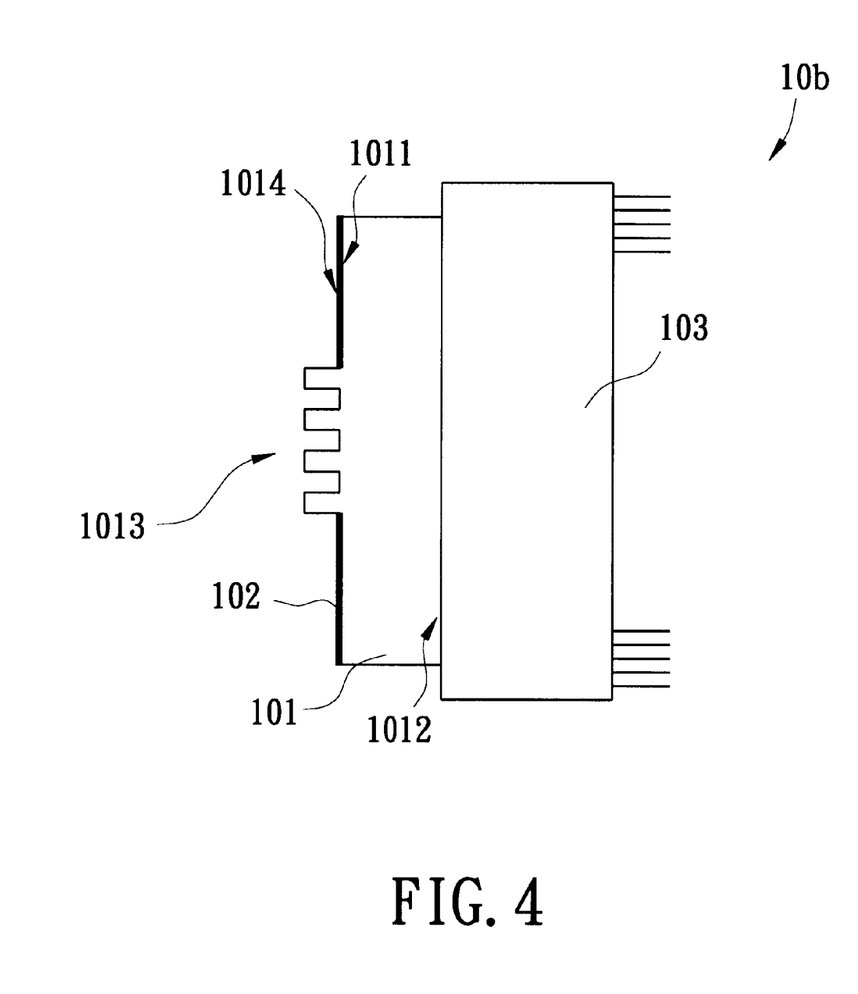
FIG. 4 shows a structure of the third embodiment of the optical element according to the invention.

As shown in FIG. 4, which shows a structure of the third embodiment of the optical element 10b according to the invention. It is formed by putting into the structure of the first optical element 10 or the second optical element 10a a holographic optical element (HOE) 103 which combines with the incident plane 1012 of the three-beam grating 101 into an integrity. This optical element 10b can control the numerical aperture too.

Figure 5:
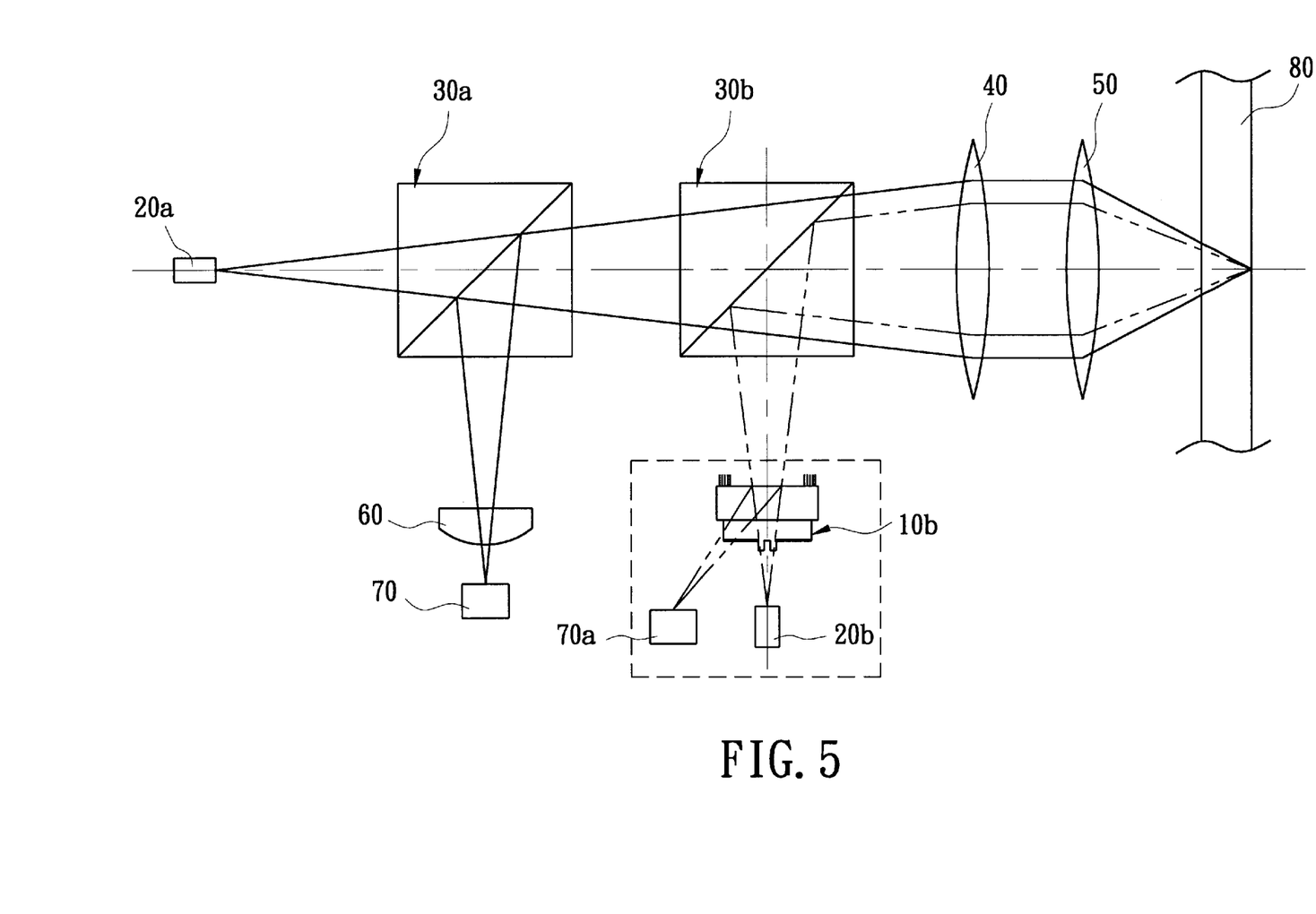
FIG. 5 shows a structure of the single objective lens optical pick-up head in the second embodiment of the invention, which discloses the application of the third optical element in a traditional pick-up head.

As shown in FIG. 5, which shows a structure of the single objective lens optical pick-up head in the second embodiment of the invention, which discloses the application of the third optical element in a traditional pick-up head. This single objective lens optical pick-up head comprises:

- a first laser beam generator 20a and a second laser beam generator 20b;
- an optical element 10b placed between the second laser beam generator 20b and the second beam splitter cube 30b for controlling the numerical aperture of laser beam from the second laser beam generator 20b;
- a first beam splitter cube 30a and a second beam splitter cube 30b;
- a collimator lens 40;
- an objective lens 50;
- a photo detector 70 and another photo detector 70a attached on the HOE; and
- a focusing lens 60.

Moreover, the laser beam from the second laser beam generator 20b passes through the optical element 10b, which controls its numerical aperture, and reaches the optic disc 80 via the assigned optical path. The reflected laser beam containing data from the surface of the optic disc 80 goes through the objective lens 50, the collimator lens 40, the second beam splitter cube 30b, the optical element 10b and gets focused on the other photo detector 70a. This completes the data retrieving process. The photo detector 70 is used to receive the reflected beam of the first laser beam generator 20a. The data recording process has the same optical path as the data retrieving process.

Figure 6:
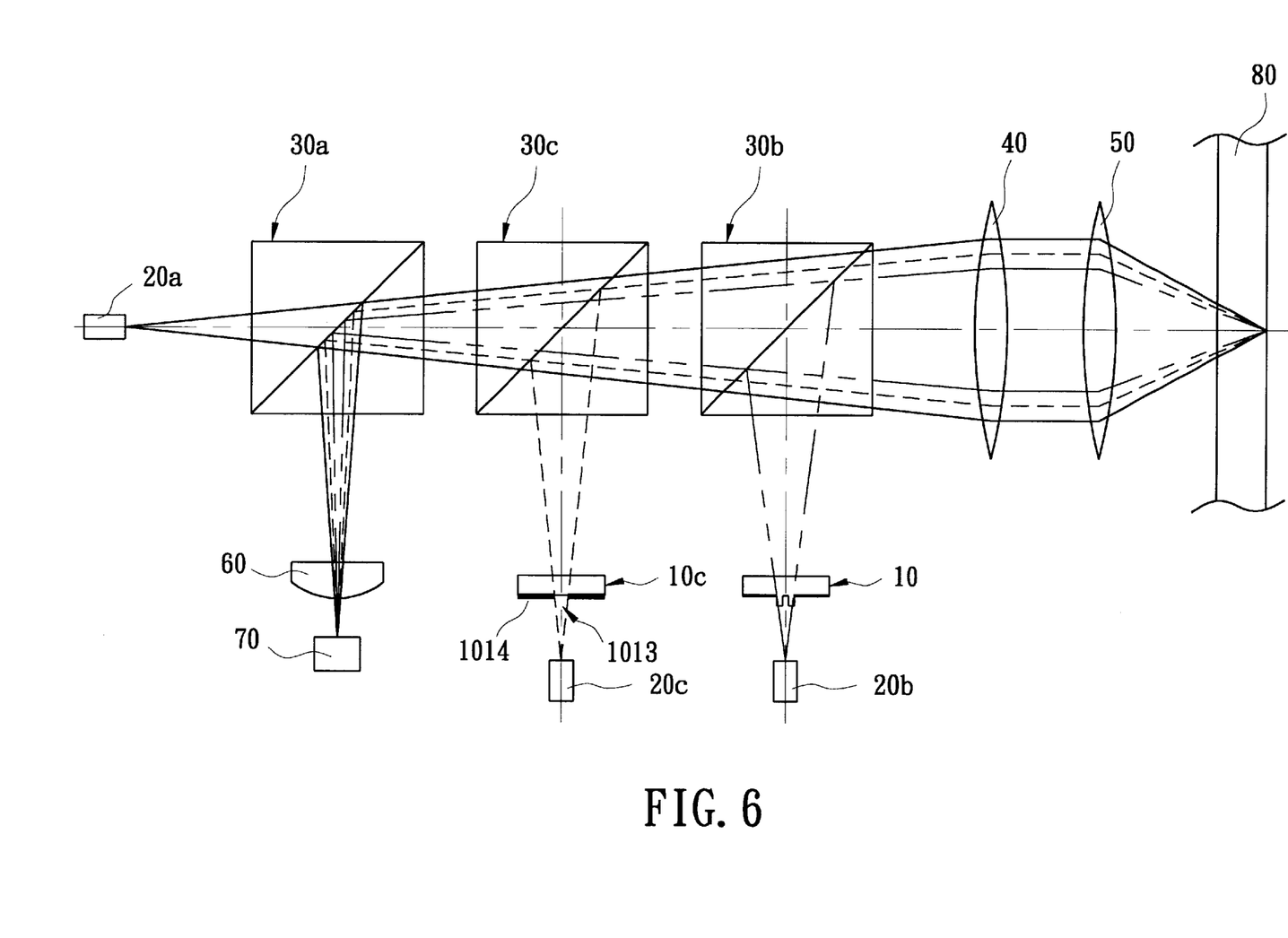
FIG. 6 shows a structure of the single objective lens optical pick-up head in the third embodiment of the invention, which discloses the application of the optical element in a three light source optical pick-up head.

As shown in FIG. 6, which shows a structure of the single objective lens optical pick-up head in the third embodiment of the invention, wherein it discloses the application of the optical element in a three light source optical pick-up head. This single objective lens optical pick-up head comprises:

- a first laser beam generator 20a, a second laser beam generator 20b, and a third laser beam generator 20c for generating laser beams with three different wavelengths for accessing the data on the optic disc 80, respectively;
- a first beam splitter cube 30a, a second beam splitter cube 30b, and a third beam splitter cube 30c for separating the first laser beams from the first laser beam generator 20a, the second laser beam from the second laser beam generator 20b and the third laser beam from the third laser beam generator 20c from the reflected beam from the optic disc 80;
- a first optical element 10, which utilizes the previously disclosed special optical element of a reflected film 102 formed on the surface of the three-beam grating 101, placed between the second laser beam generator 20b and the second beam splitter cube 30b for controlling the numerical aperture of laser beam from the second laser beam generator 20b;
- a second optical element 10c, which utilizes the coating of a reflective film 102 formed on the surface of a normal optical element to form a first diffractive area 1013 and a second diffractive area 1014, placed between the third laser beam generator 20c and the third beam splitter cube 30c for controlling the numerical aperture of laser beam from the third laser beam generator 20c;
- a collimator lens 40;
- an objective lens 50;
- a photo detector 70; and
- a focusing lens 60.

Also, the laser beam from the second laser beam generator 20b travels through the first optical element 10, the second optical element 30b, the collimator lens 40, the objective lens 50 and arrives at the optic disc 80, whereas the reflected laser beam containing data from the optic disc 80 follows the original path, but in the reverse order, and goes through the objective lens 50, the collimator lens 40, the second beam splitter cube 30b, the third beam splitter cube 30c, the first beam splitter cube 30a and gets focused by the focusing lens 60 on the photo detector 70. This data retrieving process is thus completed after the conversion of the reflected beam into electrical signals.

Yet, the laser beam from the third laser beam generator 20c travels through the second optical element 10c, the third optical element 30b, the collimator lens 40 and the objective lens 50, and arrives at the optic disc 80, whereas the reflected laser beam containing data from the optic disc 80 follows the same path as the above mentioned reflected beam of the second laser beam generator 20b and enters the photo detector 70. This data retrieving process is thus completed. The data recording process has the same laser beam path as the data retrieving process.

Figure 7:
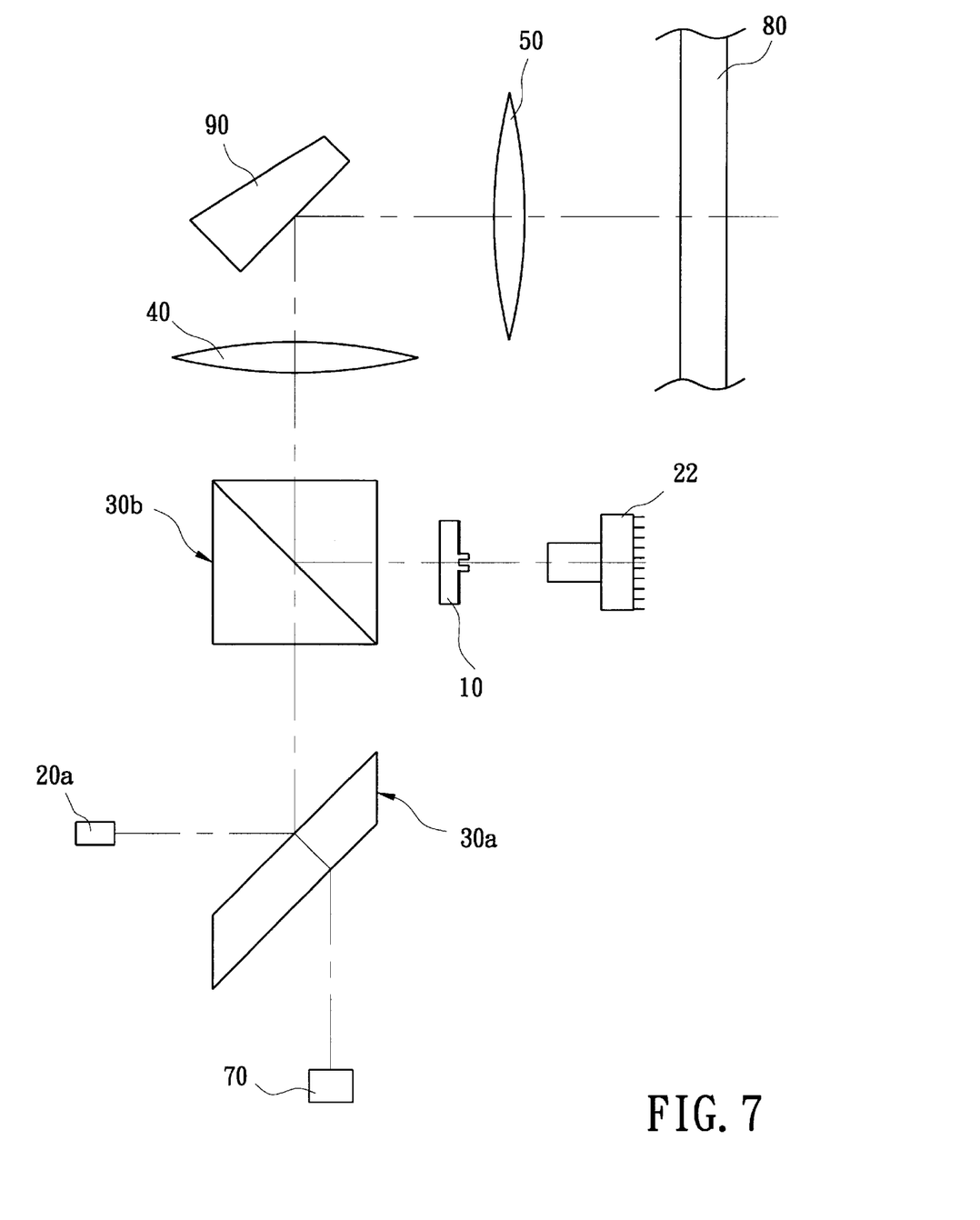
FIG. 7 is an example of applying the optical element of the invention to a two-laser DVD pick-up head.

FIG. 7 is an example of applying the optical element 10 of the invention to a double laser DVD pick-up head. The optical element 10 is placed between the holographic laser module 22 and the second beam splitter cube 30b, wherein a laser diode, an HOE and a photo detector are integrated into the holographic laser module 22 through which the data retrieving process from the optic disc 80 is completed.

Furthermore, a folding mirror (FM) is inserted into the optical path. The FM 90 is a flat wedge optical element per se, and through the natures of flatness and the wedge shape the deviation of a laser beam from the optical path can be corrected. The nature of the wedge shape corrects the angular deviation by keeping a correct incident beam angle, while the flatness nature corrects the displacement deviation of the beam.

Figure 8:
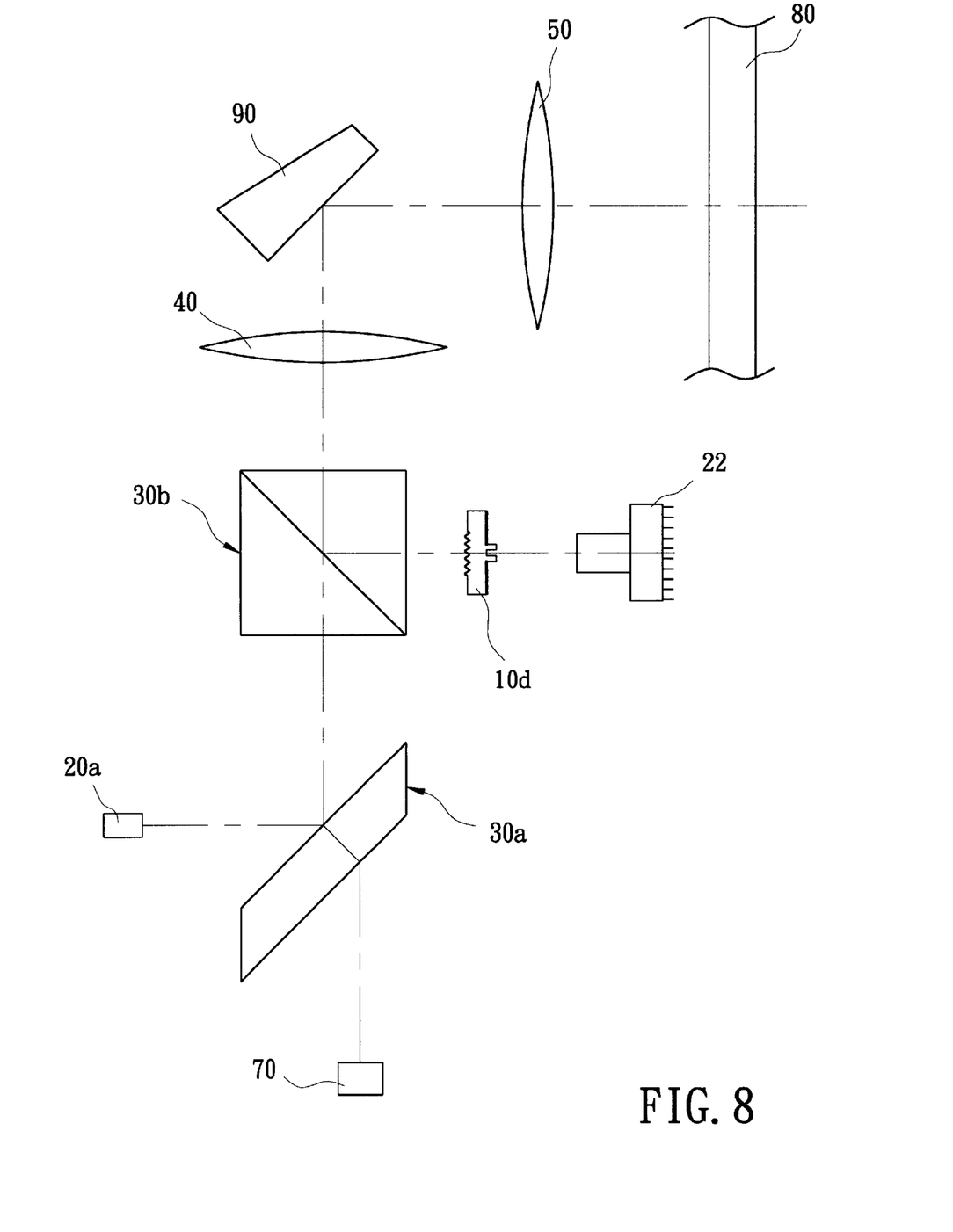
FIG. 8 is another example of applying the optical element of the invention to a two-laser DVD pick-up head.

Shown in FIG. 8 is another example of applying the optical element of the invention to a double laser DVD pick-up head. The optical element 10d, which is formed by adding a holographic optical surface to the back of the grating of the original optical element 10, is used to replace the optical element 10 in FIG. 7.

Figure 9:
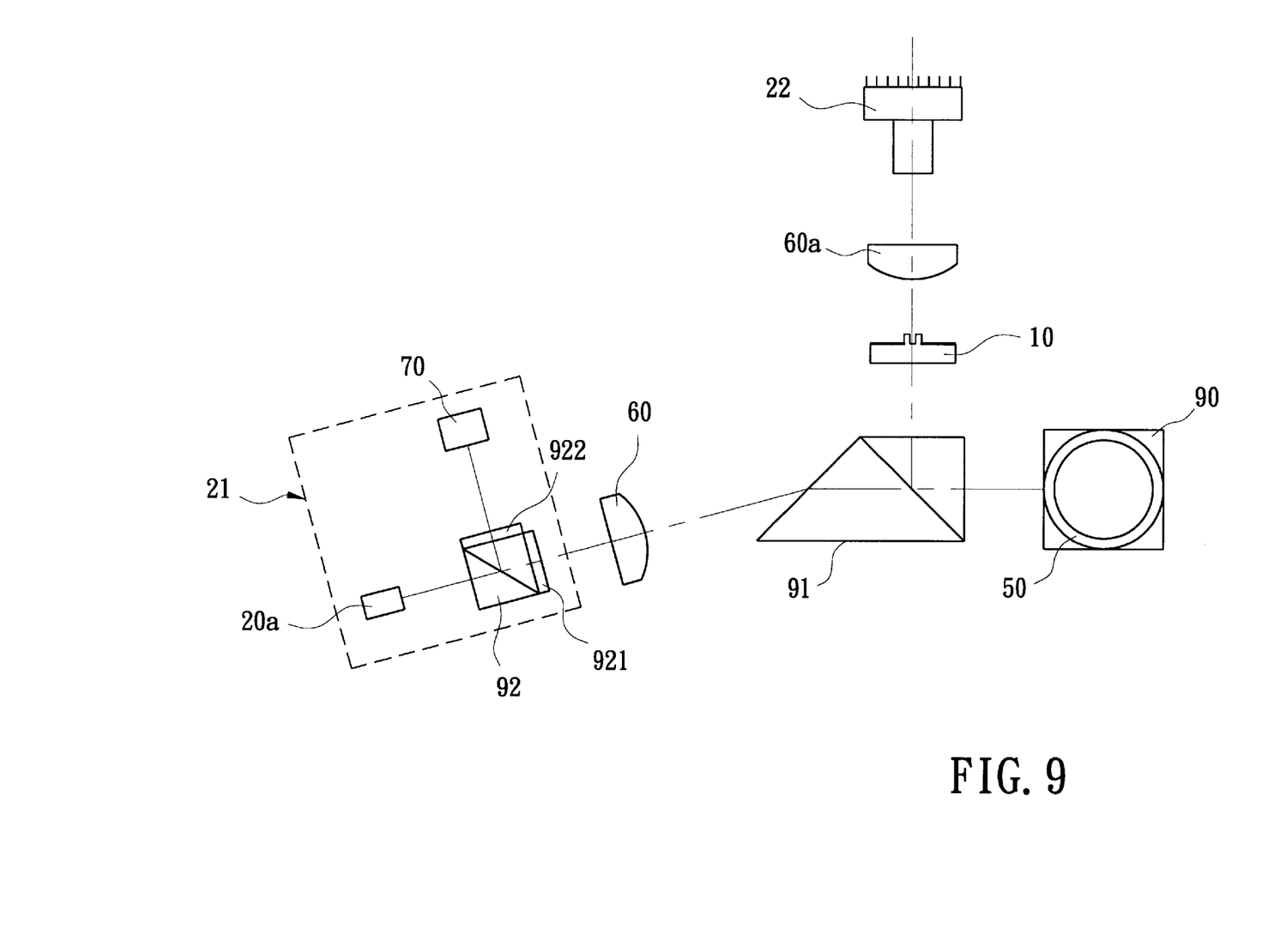
FIG. 9 is an example of applying the optical element of the invention to a DVD-RAM optical system.

As in FIG. 9, it is an example of applying the optical element of the invention to a DVD-RAM optical system. The optical element 10 is placed in front of the holographic laser module 22, and a focusing lens 60a is added between the holographic laser module 22 and the optical element 10, wherein the holographic laser module 22 integrates a laser diode, an HOE and a photo detector. The data retrieving process of the reflected laser beam from the optic disc 80 is completed with the help of the holographic laser module 22.

Moreover, the original beam splitter cube 30 is replaced by a beam shaper (BS) 91 composed of two lenses with different refractivities that can be achieved by coating on the beam merging interface. The optical path between the holographic optical element module 21 and the holographic laser module 22 comprises the following non-coplanar planes:

- a laser beam incident plane for refracting the first laser beam from the holographic optical element module 21; and
- a beam merging interface for combining the reflected beam of the first laser beam with the second laser beam from the second laser beam generator into a single optical outgoing path.

The holographic optical element module 21 comprises:

a first laser beam generator 20a;

a photo detector 70;

a birefringent polarizing beam splitter (PBS) 92 with different refractivities for beams of different polarizations, which comprises two birefringent crystals that are made of the same material and combined into a single one for separating the incident beam from the first laser beam generator 20a from the returning beam reflected from the optic disc 80; wherein the birefringent PBS further comprises:

a quarter wavelength plate (QWP) 921 interpolating between the birefringent PBS 92 and the focusing lens 60 for changing the polarization of the returning beam to be perpendicular to that of the laser source; and a HOE 922.

Figure 10:
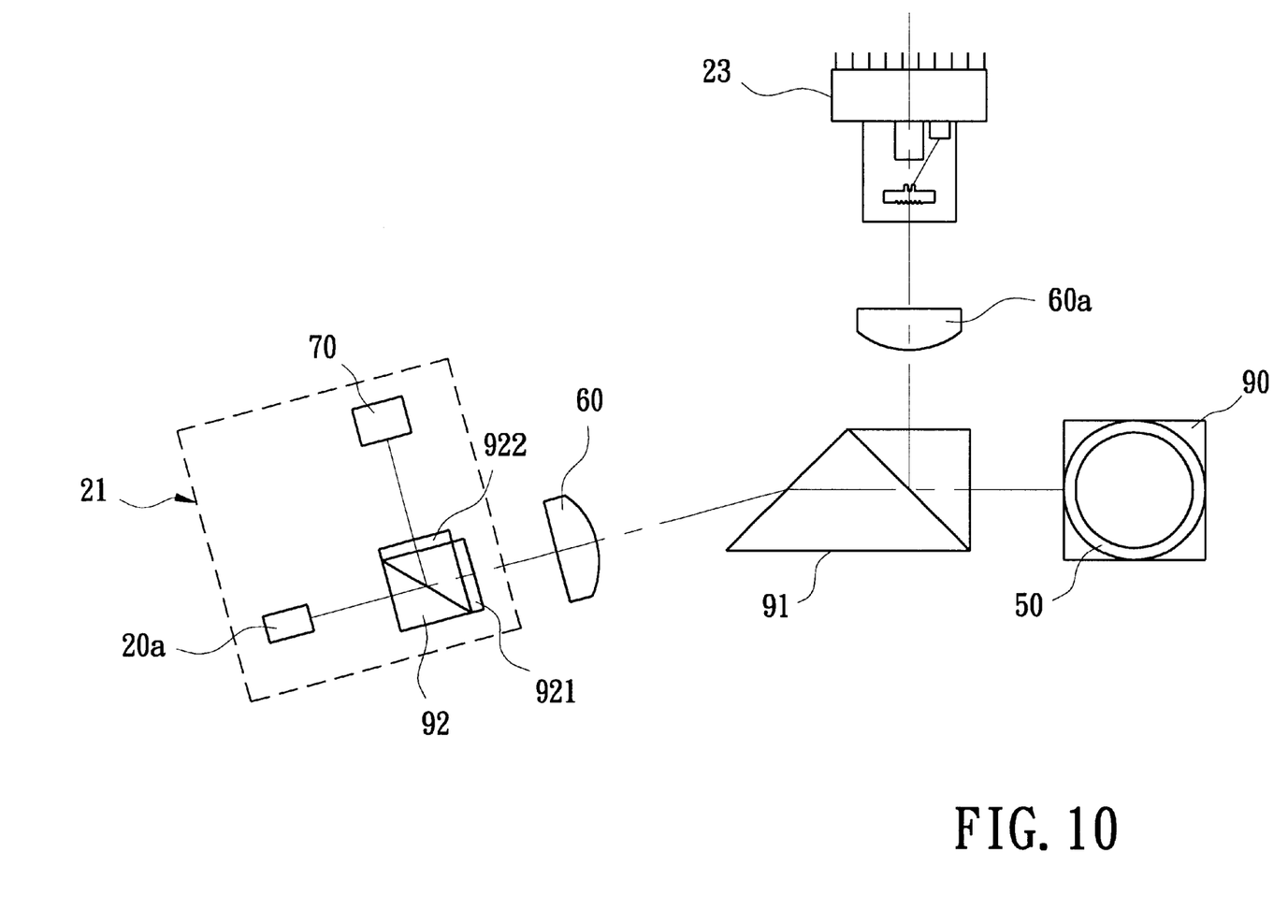
FIG. 10 is another example of applying the optical element of the invention to a DVD-RAM optical system.

FIG. 10 is another example of applying the optical element of the invention to a DVD-RAM optical system. The holographic laser module 22 in FIG. 9 is replaced by another holographic laser module 23, which integrates an optical element 10d, a laser diode, a HOE and a photo detector to perform the data access of the reflected laser beam from the optic disc 80.

The single objective lens optical pick-up head disclosed in the invention, which can perform data access on CD and DVD using only a single objective lens, has the following merits:

Integrating the numerical aperture control onto the three-beam grating prevents the reflected data beam from re-entering the laser beam generator and thus avoids the degradation of the signal quality due to the vignetting of the returning beam caused by the lens shift.

In practical manufacturing, one only needs to make an aperture on the three-beam grating by coating a reflective film of metal or dielectric material around the aperture. This is relatively easier than other patents that require an additional element and a power driving method or use lenses to change the numerical aperture. Thus, the invention is commercially more competitive.

In addition to traditional assembly procedures, only one extra alignment procedure is required, and, since the aperture is at the order of several mm, deviations of several $\mu$m will not cause errors in the signal. Thus, it is easy to assemble.

Since the structure is simple and only needs an extra coating procedure, it can be readily integrated into multi-wavelength systems such as the blue lasers, etc.

While the present invention is disclosed in the above mentioned preferred embodiments, yet they should not be construed as the limitation of the invention. Many changes and modifications in the above described embodiments of the invention can, of course, be carried out without departing from the scope thereof. Accordingly, to promote the progress in science and the useful arts, the invention is disclosed and is intended to be limited only by the scope of the appended claims.

What is claimed is:

1. A single objective lens optical pick-up head with the ability of accessing data on an optical disc, which comprises:

a first laser beam generator and a second laser beam generator for generating a first laser beam and a second laser beam with different wavelengths, respectively;

a three-beam grating having a first diffractive area placed in the central area of the three-beam grating for either of the laser beams to pass through, a second diffractive area surrounding the first diffractive area, and a reflective film covering the second diffractive area for reflecting the outer ring part of either of the laser beams to control the numerical aperture;

an objective lens for focusing each of the laser beams of different wavelengths into a spot on the data storage surface of the optic disc; and a photo detector for converting the reflected beam with data from the optic disc into electrical signals.

2. A single objective lens optical pick-up head of claim 1, which further comprises:

a first beam splitter cube for separating the first laser beam from its reflected beam with data from the optic disc;

a second beam splitter cube for separating the second laser beam from its reflected beam with data from the optic disc;

a collimator lens for making each of the first laser beam and the second laser into parallel beams; and a focusing lens for focusing the reflected beam from the first beam splitter cube on the photo detector.

3. A single objective lens optical pick-up head of claim 1, wherein the reflective film of the three-beam grating can be formed by coating of reflective material on the three-beam grating surface to achieve the reflection effect.

4. A single objective lens optical pick-up head of claim 3, wherein the reflective film of the three-beam grating can be a layer of metal or a dielectric reflective film to achieve the reflection effect.

5. A single objective lens optical pick-up head of claim 1, wherein the reflective film is on an incident plane of the three-beam grating.

6. A single objective lens optical pick-up head of claim 1, wherein the reflective film is on an outgoing plane of the three-beam grating.

7. A single objective lens optical pick-up head of claim 1, which further comprises a holographic optical element combined with an outgoing plane of the three-beam grating for separating either of the laser beam from the reflected beam with data from the disc surface.

8. An optical element applicable to a single objective lens optical pick-up head placed on the optical path between any of the laser beam generators and the objective lens of a single objective lens optical pick-up head, having a first laser beam generator, a second laser beam generator, a photo detector and an objective lens in the optical path, for controlling the numerical aperture of the laser beam from any of the laser beam generators, which optical element comprises:

a diffractive area in the central area of a three-beam grating for the laser beam to pass through; and a second diffractive area surrounding the first diffractive area and a reflective film covering the second diffractive area for reflecting the outer ring part of either of the laser beams to control the numerical aperture.

9. An optical element applicable to a single objective lens optical pick-up head of claim 8, which further comprises:

a first beam splitter cube for separating the first laser beam from its reflected beam with data from the disc;

a second beam splitter cube for separating the second laser beam from its reflected beam with data from the disc;

a collimator lens for making the first laser beam and the second laser into parallel beams; and a focusing lens for focusing the reflected beam from the first beam splitter cube on the photo detector.

10. An optical element of claim 8, wherein the reflective film of the three-beam grating can be formed by coating of reflective material on the three-beam grating surface to achieve the reflection effect.

11. An optical element of claim 10, wherein the reflective film of the three-beam grating can be a layer of metal or a dielectric reflective film to achieve the reflection effect.

12. An optical element applicable to a single objective lens optical pick-up head of claim 8, wherein the reflective film of the optical element is on an incident plane of the optical element.

13. An optical element applicable to a single objective lens optical pick-up head of claim 8, wherein the reflective film of the optical element is on an outgoing plane of the optical element.

14. An optical element applicable to a single objective lens optical pick-up head of claim 8, which further comprises a holographic optical element combined with an outgoing plane of the three-beam grating for separating the laser beam from the reflected beam with data from the disc surface.

* * * * *